(12) United States Patent
Peng et al.

(10) Patent No.: US 8,922,927 B1
(45) Date of Patent: Dec. 30, 2014

(54) SYSTEM AND METHOD FOR DETECTING AND INHIBITING CYCLE SLIP FOR MULTI-CHANNEL MEDIA DRIVE

(71) Applicant: Quantum Corporation, San Jose, CA (US)

(72) Inventors: James P. Peng, Santa Maria, CA (US); Jaewook Lee, Irvine, CA (US); Jerry Hodges, Riverside, CA (US); Turguy Goker, Solana Beach, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 14/067,653

(22) Filed: Oct. 30, 2013

(51) Int. Cl.
*G11B 5/09* (2006.01)
*G11B 20/10* (2006.01)
*G11B 5/008* (2006.01)

(52) U.S. Cl.
CPC ........ *G11B 20/1024* (2013.01); *G11B 5/00813* (2013.01)
USPC .................. 360/51; 360/42; 360/43; 360/55; 360/78.02

(58) Field of Classification Search
None
See application file for complete search history.

(56) References Cited

U.S. PATENT DOCUMENTS

| 8,275,081 B2 * | 9/2012 | Jiang et al. | 375/354 |
| 2011/0032630 A1 * | 2/2011 | Lee et al. | 360/26 |
| 2013/0343490 A1 * | 12/2013 | Wertz et al. | 375/340 |

* cited by examiner

*Primary Examiner* — Muhammad N Edun
(74) *Attorney, Agent, or Firm* — Roeder & Broder LLP; James P. Broder

(57) ABSTRACT

A method for inhibiting cycle slip in a tape drive having at least three channels that each utilizes a corresponding numerically controlled oscillator includes establishing a reference clock that is based on an output of the numerically controlled oscillators for at least two of the channels, comparing the output of the numerically controlled oscillator for one of the three channels with the reference clock to determine a first channel phase delta value for the one channel, and generating an error signal for the one channel if the channel phase delta value exceeds a threshold phase delta value for the one channel. The method may also include applying an inhibition loop filter to the error signal for the one channel if the first channel phase delta value exceeds the threshold phase delta value, adjusting a gain of the inhibition loop filter based at least partially upon one of the first channel phase delta value and the threshold phase delta value, and/or feeding back the error signal to the numerically controlled oscillator of the one channel.

20 Claims, 6 Drawing Sheets

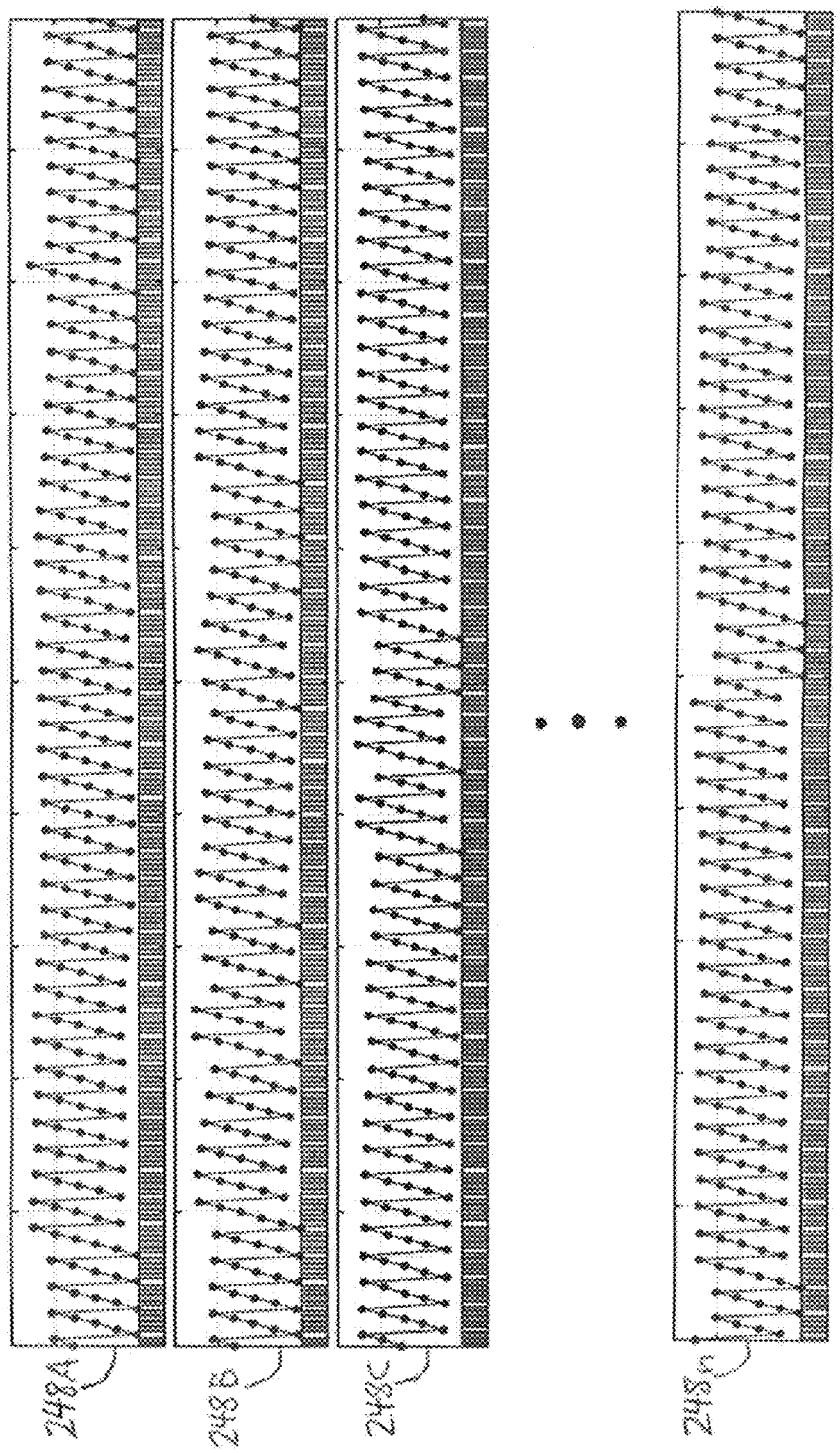

SYSTEM AND METHOD FOR DETECTING AND INHIBITING CYCLE SLIP FOR MULTI-CHANNEL MEDIA DRIVE

BACKGROUND

In a media drive, such as a Linear Tape Open (LTO) drive, a self-clocking technique is commonly used for reproducing a phase-synchronized digital signal from a read back signal at a certain sampling frequency. The self-clocking technique generally involves the use of phase-locked loop (PLL) and interpolator (ITR) circuits. For example, in a multi-channel tape drive, each channel has its own PLL to track its phase and frequency errors and generate its own channel bit clock. Generally speaking, the phase error in a multi-channel tape drive contains two main components: (1) phase errors that are unique to individual channels, and (2) a frequency component that is common to all channels. Tracking the error unique to each individual channel allows monitoring of a different phase for each different channel, and tracking the error common to all channels makes all clocks run at approximately the same frequency on average.

Various sources could cause the PLL/ITR circuitry for one or more of the channels to either slip one or more bits, or insert one or more extra bits into the sequence of the phase-synchronized digital signal (also known as "cycle slip"). Inhibiting and/or preventing cycle slip is critical for a reliable and robust media drive because once cycle slip occurs, all of the following code words are incorrectly framed and can thereafter become a long train of uncorrectable errors.

Traditional cycle slip detectors have been implemented in media drives that utilize a single data stream. These types of detectors typically require expensive logics and a relatively long time delay. As technology has advanced, an increasing number of applications have migrated from a single channel media drive to a multiple parallel channel media drive for the transfer of data. For example, over approximately the past decade, the number of parallel channels for many magnetic tape drives has increased from four to eight to 16, with potentially an even greater number coming in the foreseeable future.

In a media drive with multiple inputs and multiple outputs (a MIMO system), there is additional useful information between channels that does not exist in a single channel media drive. When the ITR receives a sequence of erroneous phase and/or frequency information at its input, the numerically controlled oscillator (NCO) block will experience incorrect integration that results in one or more cycle slip events at the bit clock output controlling sampling of the data. Even though the root cause errors are short and within the correction power of a C1 error correction code (ECC), the fact is that they result undesirable cycle slip events. The end result can include a C1 ECC failure due to error propagation.

Fundamental PLL architecture typically includes three major blocks: a Mueller-Miller (MM) phase detector, one or more loop filters, and the NCO. Each of these blocks includes a separate gain. The MM phase detector gain is pattern dependent and can, for example, cover a range from approximately 0.44 to 3.14, in 12T to 2T patterns. In one typical system, nominal loop filter parameters are such that the integral gain is 0.0003, proportional gain is 0.03, and the NCO gain is 1. These numbers can vary based on usage and tuning, however the relative gain differences between blocks are likely to be somewhat similar to these. For example, MM gain will have large and wide variation compared to the loop filter gain(s), and the NCO gain will be larger than the loop filter gain(s). These gains are usually optimized for a steady state loop performance requirement such as bandwidth, phase margin, and gain margin, and assumes that the media drive does not have erroneous input conditions.

When the PLL encounters erroneous transient disturbances, the MM phase detector will typically amplify them. The loop filter integrator will be impacted to a relatively low extent due to very low gains since the function of the loop filter integrator is to track speed variation, rather than phase shift. Therefore, conventional global timing recovery applications which are based on averaging multiple channel loop filter integrators do not effectively or necessarily resolve the problem of cycle slip as described herein. However, the loop filter proportional gain will pass the amplified MM output to the NCO block with some level of attenuation. These transient error events at the input of the NCO block will result in the NCO integrator quickly moving toward an incorrect position and eventually locking into an incorrect phase cycle as the overall PLL loop stabilizes. This move of the NCO integrator to an incorrect position is one of the primary causes of the error propagation event that results in C1 ECC failure.

SUMMARY

The present invention is directed toward a method for inhibiting cycle slip in a tape drive having at least three channels that each utilizes its own corresponding numerically controlled oscillator. In one embodiment, the method includes the steps of (i) establishing a reference clock that is based on an output of the corresponding numerically controlled oscillator for at least two of the channels, (ii) comparing the output of the numerically controlled oscillator for any one of the three channels with the reference clock to determine a first channel phase delta value for the one channel, and (iii) determining whether the first channel phase delta value exceeds a threshold phase delta value for the one channel.

In another embodiment, the method also includes the step of applying an inhibition loop filter to the output of the numerically controlled oscillator for the one channel if the first channel phase delta value exceeds the threshold phase delta value.

In yet another embodiment, the method further includes the step of adjusting a gain of the numerically controlled oscillator based at least partially upon one of the first channel phase delta value and the threshold phase delta value.

In still another embodiment, the method further includes the step of feeding back an output of the inhibition loop filter to the numerically controlled oscillator of the one channel.

In another embodiment, the method also includes the step of reestablishing the reference clock on a periodic basis.

In an alternative embodiment, the method further includes the step of setting the threshold phase delta value based at least partially upon empirical data from monitoring at least one of (i) a phase correction signal of the channel, and (ii) the reference clock.

In another embodiment, the method also includes the steps of (i) comparing the output of the numerically controlled oscillator for each of the channels with the reference clock to determine a channel phase delta value for each of the channels, and (ii) individually determining whether each of the channel phase delta values exceeds the threshold phase delta value.

In still another embodiment, the method includes the step of, for each channel, individually applying a loop filter to the output of the numerically controlled oscillator for such channel to adjust the phase of such channel if such channel phase delta value exceeds the threshold phase delta value for such channel.

In another embodiment, the method also includes the step of, for each channel, adjusting a gain of the loop filter based at least partially upon one of the channel phase delta value for such channel and the threshold phase delta value for such channel.

In yet another embodiment, the step of establishing includes the step of excluding the output of the numerically controlled oscillator for one of the three channels.

In an alternative embodiment, the step of excluding includes the step of basing the exclusion on a signal to noise ratio of the one of the three channels.

In still another embodiment, the step of establishing includes the step of applying a statistical analysis on the outputs of the numerically controlled oscillators for the at least two channels.

In another embodiment, the threshold phase delta value changes over time.

The present invention is also directed toward a tape drive that utilizes any of the methods provided above, either individually or in combination.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2 is a series of graphs illustrating an output of numerically-controlled oscillators over time for a plurality of channels in one embodiment of the media drive illustrated in FIG. 1A;

DESCRIPTION

Figure 1A:
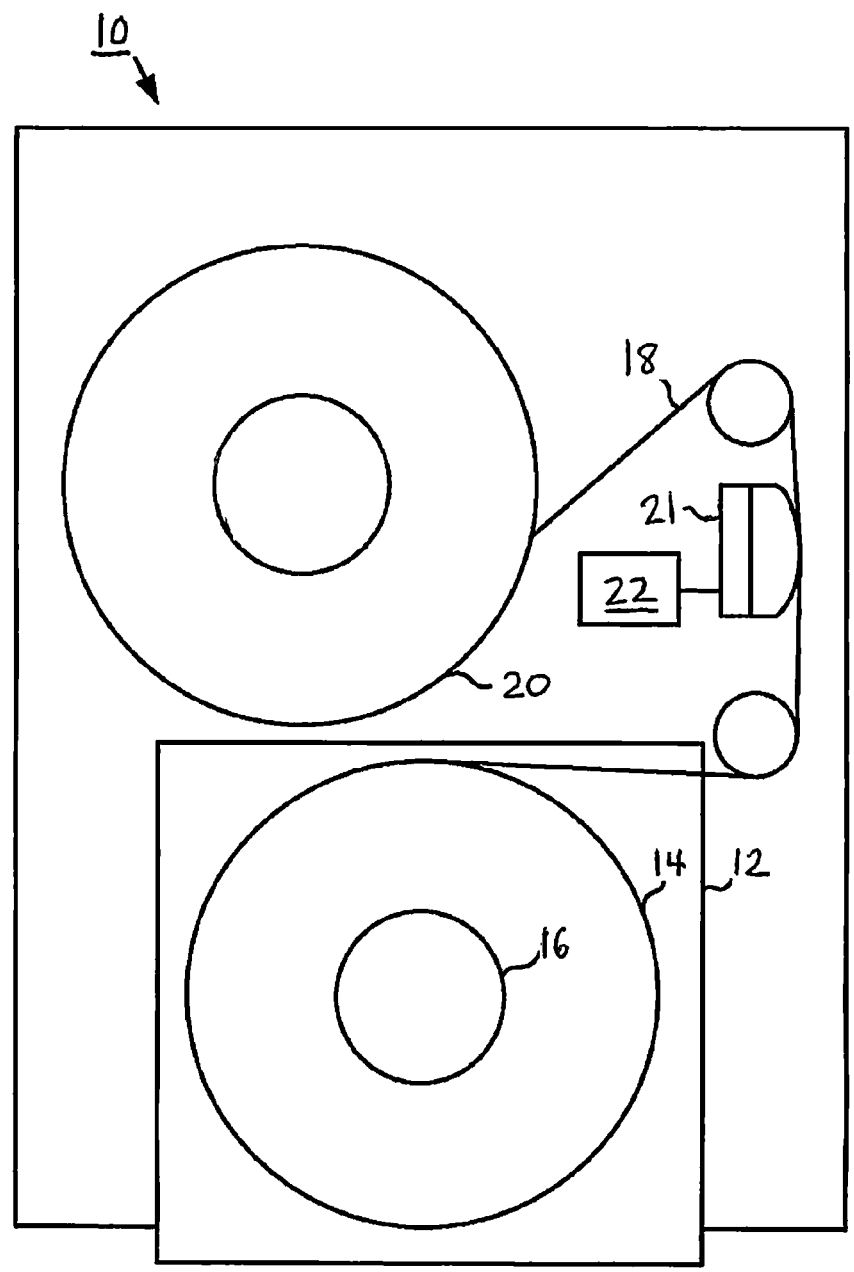
FIG. 1A is a simplified top view illustration of a media drive including a system for detecting and inhibiting cycle slip having features of the present invention.

FIG. 1A is a diagram of an example media drive, in this case a tape drive 10, according to one embodiment. In the embodiment illustrated in FIG. 1A, the tape drive 10 includes methods and or modules, as described herein, for detecting and inhibiting cycle slip in the tape drive 10. The tape drive 10 represents a generic tape drive, and is shown by way of example and not by way of limitation. In one embodiment, the tape drive 10 operates in compliance with an LTO specification, such as LTO-6. It is appreciated that the subject matter described herein is not limited to use with/within the tape drive 10, but instead is operable with/within a variety of tape drives or other media drives. The tape drive 10 is shown with a tape cartridge 12 inserted into the tape drive 10. The tape cartridge 12 is removable from the tape drive 10, and includes a cartridge reel 14 with a cartridge reel hub 16. A tape 18 is spooled about the cartridge reel hub 16 of the cartridge reel 14. The tape cartridge 12 supplies the tape 18 to the tape drive 10. The tape drive 10 includes a drive reel 20 which takes up the tape 18 from the tape cartridge 12 (when inserted) and moves the tape 18 across a head 21. The tape drive 10 also includes a controller 22 that can be communicatively coupled to the head 21.

Figure 1B:
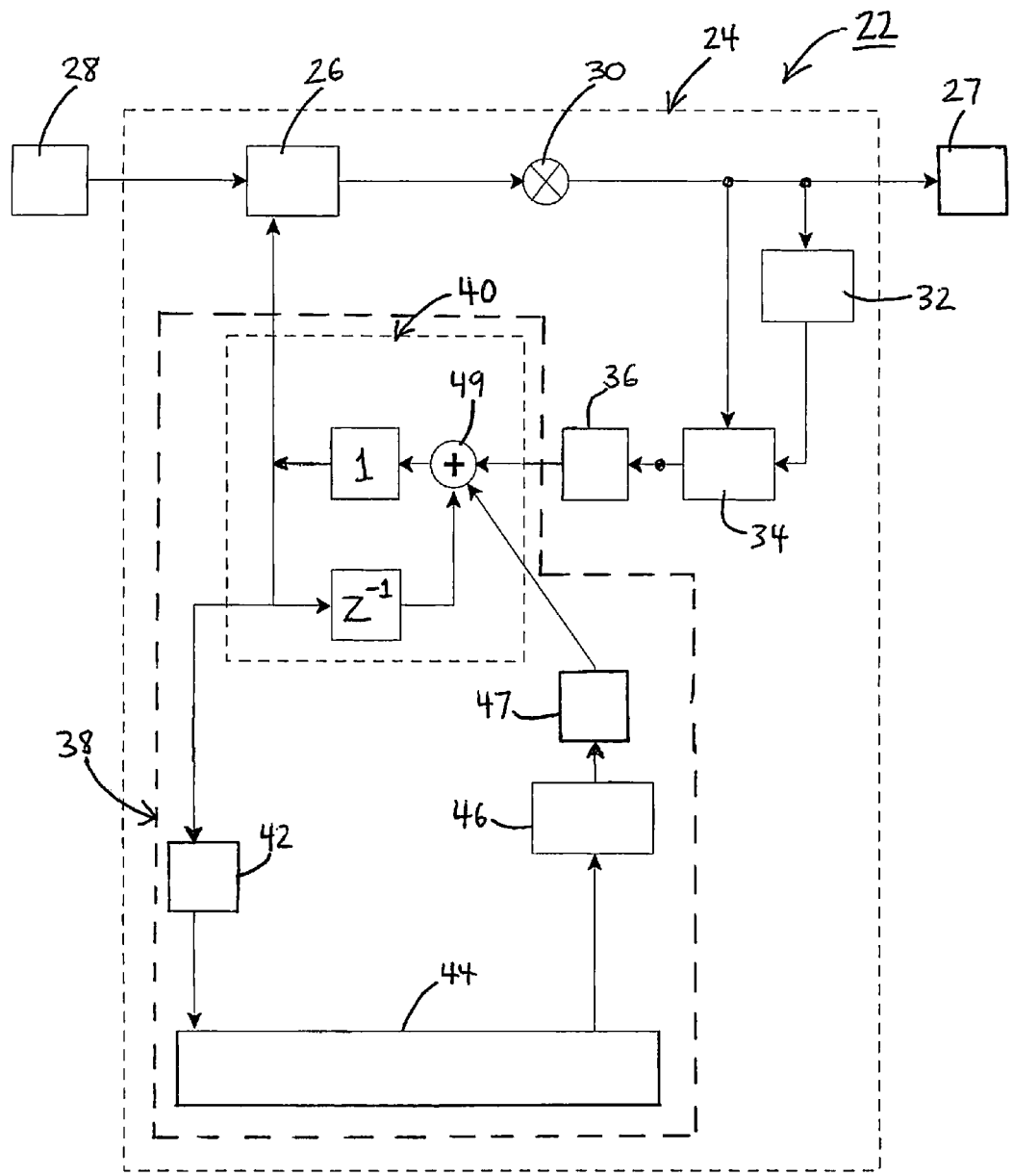
FIG. 1B is a schematic diagram including one embodiment of the system for detecting and inhibiting cycle slip illustrated in FIG. 1A.

FIG. 1B is a schematic diagram including one embodiment of at least a portion of the controller 22. In one embodiment, the controller 22 can include one or more integrated circuits that can be used to reproduce and/or generate a phase-synchronized digital output signal 27 from an incoming read-back or input signal 28 (illustrated in FIG. 1B) at a certain sampling frequency for each channel 248A-248n (illustrated in FIG. 2) in the tape drive 10. In the embodiment illustrated in FIG. 1B, for each channel 248A-248n, the controller 22 includes the use of a phase-locked loop 24 ("PLL") used for self-clocking. Hereinafter, the description of the PLL 24 shall be understood to apply for each channel 248A-248n in the tape drive 10.

In one embodiment, the PLL 24 includes one or more interpolators 26 that receive the incoming read-back signal 28, one or more gain controls 30, one or more slicers 32, a phase detector 34, one or more low pass filters 36 and a cycle slip detection and inhibition system 38 (also sometimes referred to herein as a "system"), which includes, among other features described herein, a numerically-controlled oscillator 40. It is recognized that the PLL 24 can include additional features or structures not listed or identified herein. Alternatively or additionally, the PLL 24 can omit certain structures described herein without deviating from the intent of the invention.

The interpolator 26 can adjust the phase of its sampling clocks in very fine increments. An output of the interpolator 26 eventually is transmitted to the phase detector 34 either directly or via one or more slicers 32. The signal then passes through the low pass filter 36, after which the signal is received by the NCO 40 of the system 38. A primary function of the NCO 40 is to generate a correct clock phase by accumulating an attenuated phase error from the low pass filter 36.

The cycle slip detection and inhibition system 38 detects when cycle slip has occurred or may imminently occur. Further, the system 38 can also inhibit and/or prevent future cycle slips from occurring. Although the system 38 herein is particularly useful in multi-channel media drives, it is recognized that the system 38 can also be utilized in single channel media drives, and reference to multi-channel media drives is not intended to be limiting in any manner. Further, although the description herein refers specifically to tape drives, it is understood that the system 38 can equally be used in other types of media drives, and reference specifically to tape drives is likewise not intended to be limiting in any manner.

The design of the cycle slip detection and inhibition system 38 can vary to suit the design requirements of the tape drive 10 (illustrated in FIG. 1A). In the embodiment illustrated in FIG. 1B, the system 38 can include a feedback loop from the output of the NCO 40 back into the NCO 40 before eventually being transmitted to the interpolator 26. In one embodiment the system 38 includes the NCO 40, a reference clock generator 42, an error detector 44, an inhibition loop filter 46 and a cycle slip inhibitor 47.

Figure 3:
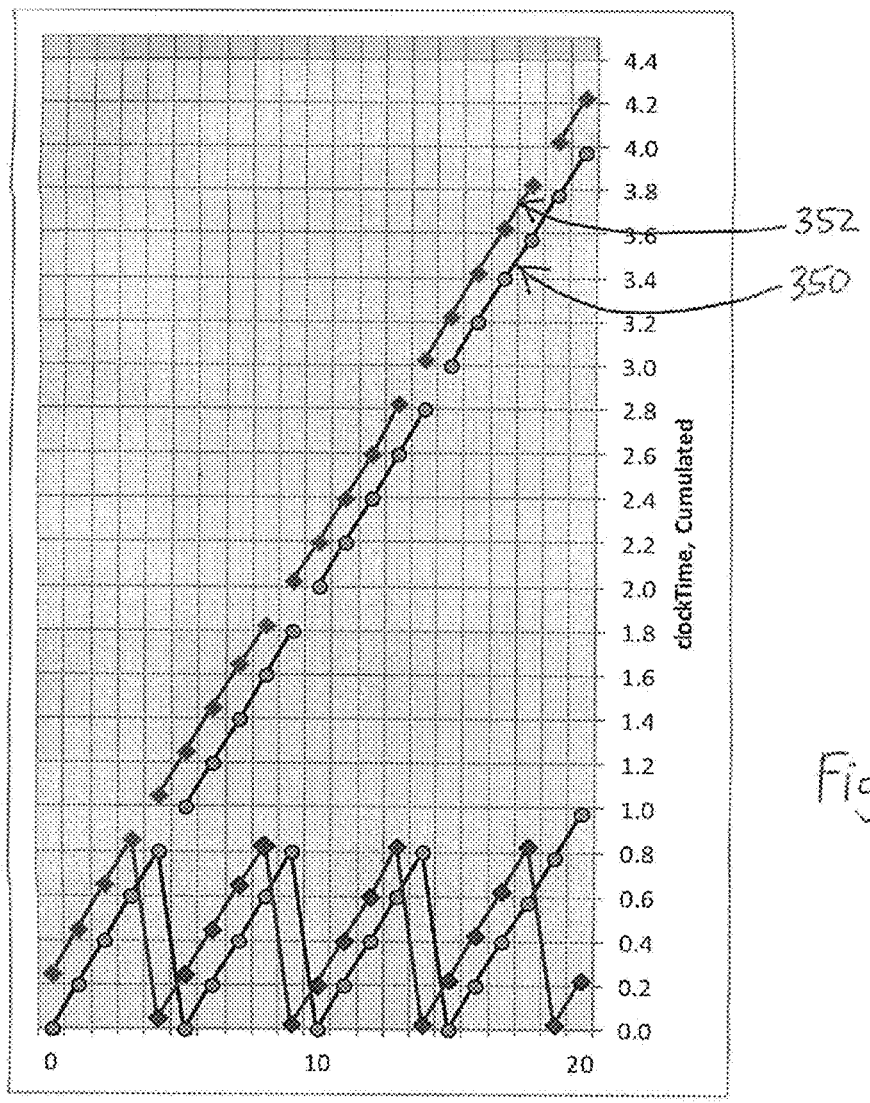
FIG. 3 is a graph illustrating a difference in phase between a reference clock (circle points) and one specific channel (square points)

The reference clock generator 42 monitors the output of the NCO 40 of multiple channels 248A-248n to generate and/or establish a "global" reference clock 350 (illustrated in FIG. 3). In one embodiment, at least two of the channels 248A-

248*n* are monitored. Alternatively, all of the channels are monitored. There is no upper limit to the number of channels that can be monitored for establishing the reference clock 350. By monitoring the output of the NCO 40 for multiple channels, the reference clock 350 that is generated is more reliable. In one embodiment, digital signal processing (DSP) implementation of statistical methods such as taking the mean, taking the median and/or applying a trend analysis to the output of the NCO 40 to establish and/or generate the reference clock, and/or to conclude a channel is straying from the reference clock. Generally speaking, the greater number of channels from which the output of the NCO 40 is utilized, the more reliable the reference clock 350 will be. It should be noted that the reference clock 350 can be re-established on a periodic basis to increase the likelihood of its accuracy, as the output of the NCO 40 for one or more of the channels 248A-248*n* will likely change somewhat over time.

Referring to FIG. 2, the output of the NCO 40 (illustrated in FIG. 1B) is represented for a number of channels of the tape drive 10. In the embodiment illustrated in FIG. 2, the output of the NCO 40 for a first channel 248A, a second channel 248B, a third channel 248C, and so on, up to an nth channel 248*n* are monitored. Any number of channels may be monitored.

FIG. 3 is a graph illustrating both the reference clock 350 (circle points) as well as an NCO output 352 (square points) for one of the channels 248A-248*n* as a function of cumulated clock time. In FIG. 3, the reference clock 350 and the output 352 of the NCO 40 for each channel individually are unwrapped to detect whether a difference in phase (phase delta) between the reference clock 350 and the output 352 of the NCO for any or all specific channels (individually) exists. The error detector 44 (illustrated in FIG. 1B) monitors the extent of any difference between the output of the NCO for a single channel 248A-248*n* and the reference clock 350 to determine whether cycle slip has occurred and/or will imminently occur. The error detector 44 (illustrated in FIG. 1B) filters out a common phase error that is shared by all of the channels 248A-248*n*, thereby allowing an erroneous transient phase error to be detected. By comparing the output 352 of the NCO 40 of each individual channel 248A-248*n* to the reference clock 350, a phase delta value or offset can be determined.

Figure 4:
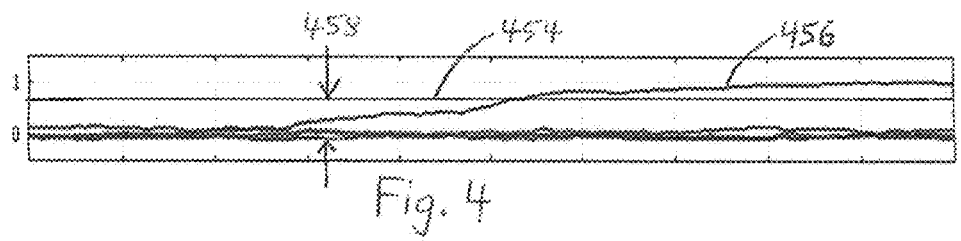
FIG. 4 is a graph illustrating the phase delta of a plurality of different channels in the media drive illustrated in FIG. 1A, including a threshold phase delta and one specific channel exceeding the threshold phase delta value.

FIG. 4 is a graph illustrating the channel phase delta of a plurality of different channels in the media drive illustrated in FIG. 1A, including a threshold phase delta value 454 and one specific channel 248A-248*n* having a channel phase delta value 456 that exceeds the threshold phase delta value 454. In one embodiment, the channel phase delta value 456 represents a percentage by which the specific output of the NCO 40 for any one channel is out of phase relative to the reference clock 350. As long as the channel 248A-248*n* keeps its own timing advance correct, this offset should stay substantially constant on average with a certain variance due to the individual component in the phase error. This is referred to as a steady state phase offset reference for that channel, which is in an acceptable phase delta range 458 (between arrows). If one of the channels is in the process of developing a cycle slip, the phase offset of that channel will start deviating from the steady state phase offset reference for that channel, and may eventually cross over the threshold phase delta value 454. When this cross-over occurs, a cycle slip "flag" is set and a cycle slip error signal (also sometimes referred to simply as an "error signal") can then be transmitted to the inhibition loop filter 46 and/or the cycle slip inhibitor 47. In one embodiment, the threshold phase delta value 454 can be a percentage, such as 75%. In non-exclusive alternative embodiments, this percentage can be greater or less than 75%, such as 10%, 25%, 50%, or any other suitable percentage depending upon the desired results.

Additionally, or alternatively, the threshold phase delta value 454 can be different for each channel 248A-248*n*, or it can be the same for two or more channels and different for other channels, or it can be the same for all channels. Setting the threshold phase delta value 454 can be a trade-off between following the particular channel's own phase correction signal and following the reference clock. Additionally, media type, format (with or without write equalization), reader (Anisotropic Magnetoresistance versus Giant Magnetoresistance) can all influence the setting of the threshold phase delta value 454. In one embodiment, the optimal level of the threshold phase delta value 454 is determined empirically from monitoring at least one of (i) a phase correction signal of the channel, and (ii) the reference clock 350. Alternatively, or in addition, the threshold phase delta value 454 can change periodically over time, either automatically, or manually as determined by the user.

In the embodiment illustrated in FIG. 1B, the inhibition loop filter 46 receives the error signal from the error detector 44 in the event the threshold phase delta value 454 is exceeded (taking into account hysteresis) by one or more of the channels 248A-248*n*. Upon receiving the error signal, the inhibition loop filter 46 can filter, decrease, inhibit or minimize any noise that may exist in the error signal prior to the error signal being transmitted to the NCO input summing node 49.

The cycle slip inhibitor 47 can be a switch that closes the NCO feedback loop of the system 38 in the event the threshold phase delta value 454 is exceeded by one of the channels 248A-248*n*. The cycle slip inhibitor 47 uses the cross-over amount described above (an amount or percentage above the threshold phase delta value) as an error signal to be used in the inhibition logic. In one embodiment, the cycle slip inhibitor 47 is a closed loop servo system. When the cycle slip inhibitor 47 closes the feedback loop, the error signal is transmitted to the NCO input summing node 49 for that channel 248A-248*n*. In the event the threshold phase delta value 454 is not exceeded by a particular channel 248A-248*n*, i.e. no error signal is generated, the cycle slip inhibitor 47 will not close the feedback loop, and the system 38 will continue to run open loop. In this event, the NCO input summing node 49 for that channel 248A-248*n* will be unaffected by the system 38.

In one embodiment, the cycle slip inhibitor 47 is in an off mode with its loop open until it receives a "trigger signal" from the error detector 44. Once the trigger signal is received by the cycle slip detector 47, the cycle slip detector 47 can transition to a closed loop mode thereby inhibiting the NCO 40 from moving into incorrect phase positions. By tuning the level of the trigger signal and loop dynamics, a 165 bit locking window requirement can be achieved.

Although the embodiment illustrated in FIG. 1B shows the inhibition loop filter 46 being positioned between the error detector 44 and the cycle slip inhibitor 47, it is recognized that the system 38 can work substantially equally effectively if the cycle slip inhibitor 47 is positioned between the error detector 44 and the inhibition loop filter 46. Still alternatively, the inhibition loop filter 46 can be omitted altogether, although this may result in an error signal having a lower signal to noise ratio, which may ultimately result in the system 38 not functioning as well as if the inhibition loop filter 46 were present in the system.

The NCO summing node 49 receives the error signal from the error detector 44 and/or the inhibition loop filter 46. The NCO summing node uses the error signal to correct the phase for that particular channel 248A-248*n*. Depending upon the particular threshold phase delta value set for that channel, the signal of the PLL 24 will be corrected to an appropriate extent at the NCO 40.

Figure 5:
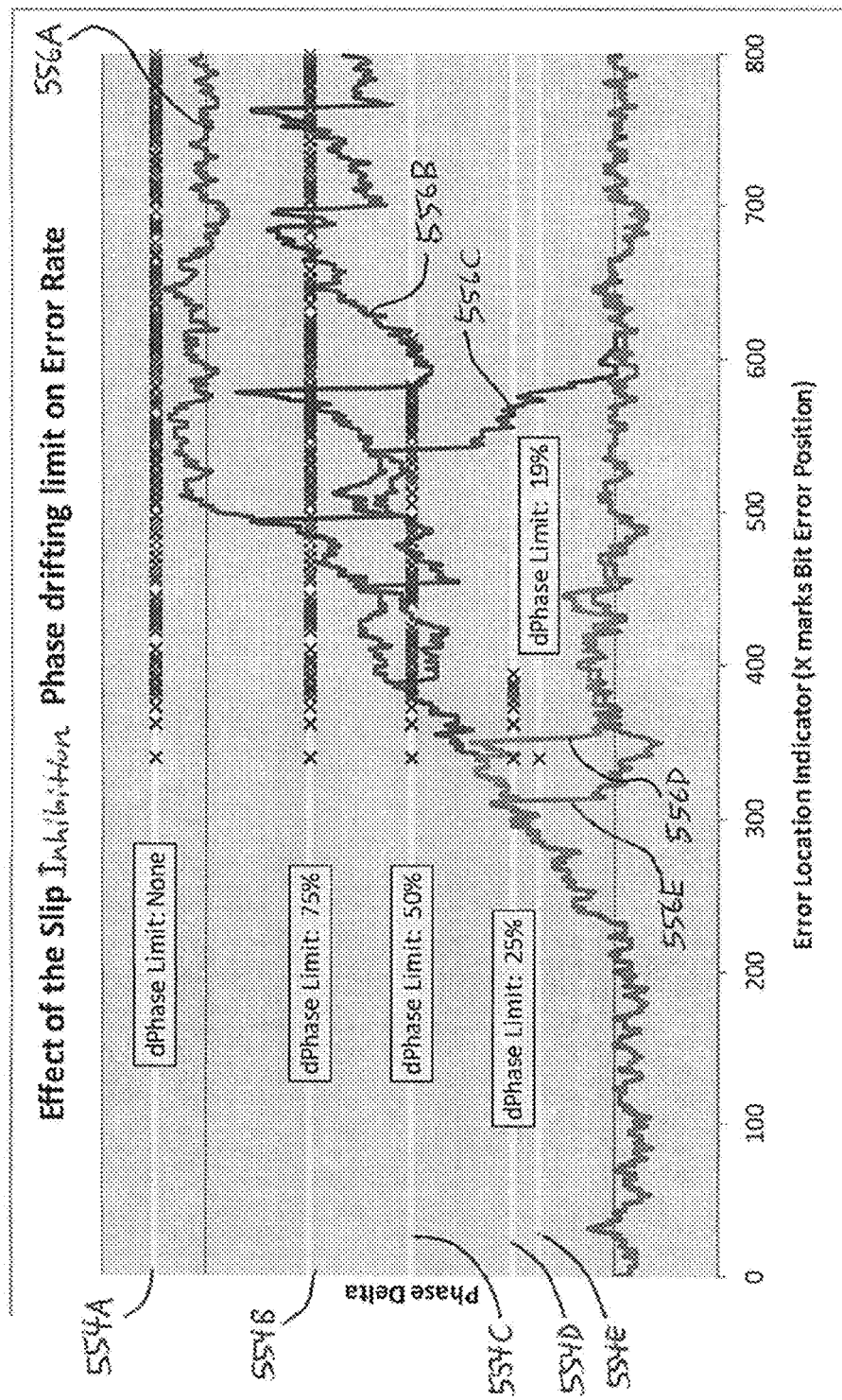
FIG. 5 is a graph illustrating the effect of inhibition of cycle slip with respect to error rate at different representative threshold phase delta values.

FIG. 5 is a graph illustrating the effect of inhibition of cycle slip with respect to error rate with no threshold phase delta value 554A and four other representative threshold phase delta values 554B-554E. In FIG. 5, four of five different threshold phase delta values 554B-554E are illustrated as a comparison to show how cycle slip is inhibited or prevented altogether versus having no threshold phase delta value 554A. At lower threshold phase delta values 454, cycle slip potential is detected sooner. Once it is determined that the channel phase delta value 556B-556E exceeds the threshold phase delta value 554B-554E, which may or may not include hysteresis thresholding, an error signal is generated. This error signal is added to the NCO input summing node 49 (illustrated in FIG. 1B) after applying the inhibition loop filter 46 (illustrated in FIG. 1B) which controls dynamics of the closed loop servo requirement for a 165 bit locking window. If no threshold phase delta value 554A is set, or if the threshold phase delta value 554B-554E is not exceeded, the channel phase delta value 556A will not be corrected.

The system disclosed herein detects the events described above, and inhibits and/or prevents the NCO 40 from moving into unwanted positions before the C1 ECC decoder failure occurs. The C1 RS code, for example for the LTO5/6 format, can detect and correct up to 5 bytes of errors at 8 bits per byte and 4 C1 codeword interleaved this makes 5*8*4=160 bits before the RLL code which comes before the C1 decoder. RLL is a 33/32 code and therefore at its input there are (160/32)*33=165 bits of data. Therefore, during these types of cycle slip causing error events, PLL must lock and remain in correct phase within 165 bits. This requires detection and prevention within 165 bits. For large defects greater than 165 bit duration, the inhibition logic state is a signal for C1 ECC that can be used as an erasure indicator if the C1 decoder input is buffered. Operating C1 decoder in erasure mode, this feature can increase the C1 ECC power by two times when these types of events are detected.

Figure 6:
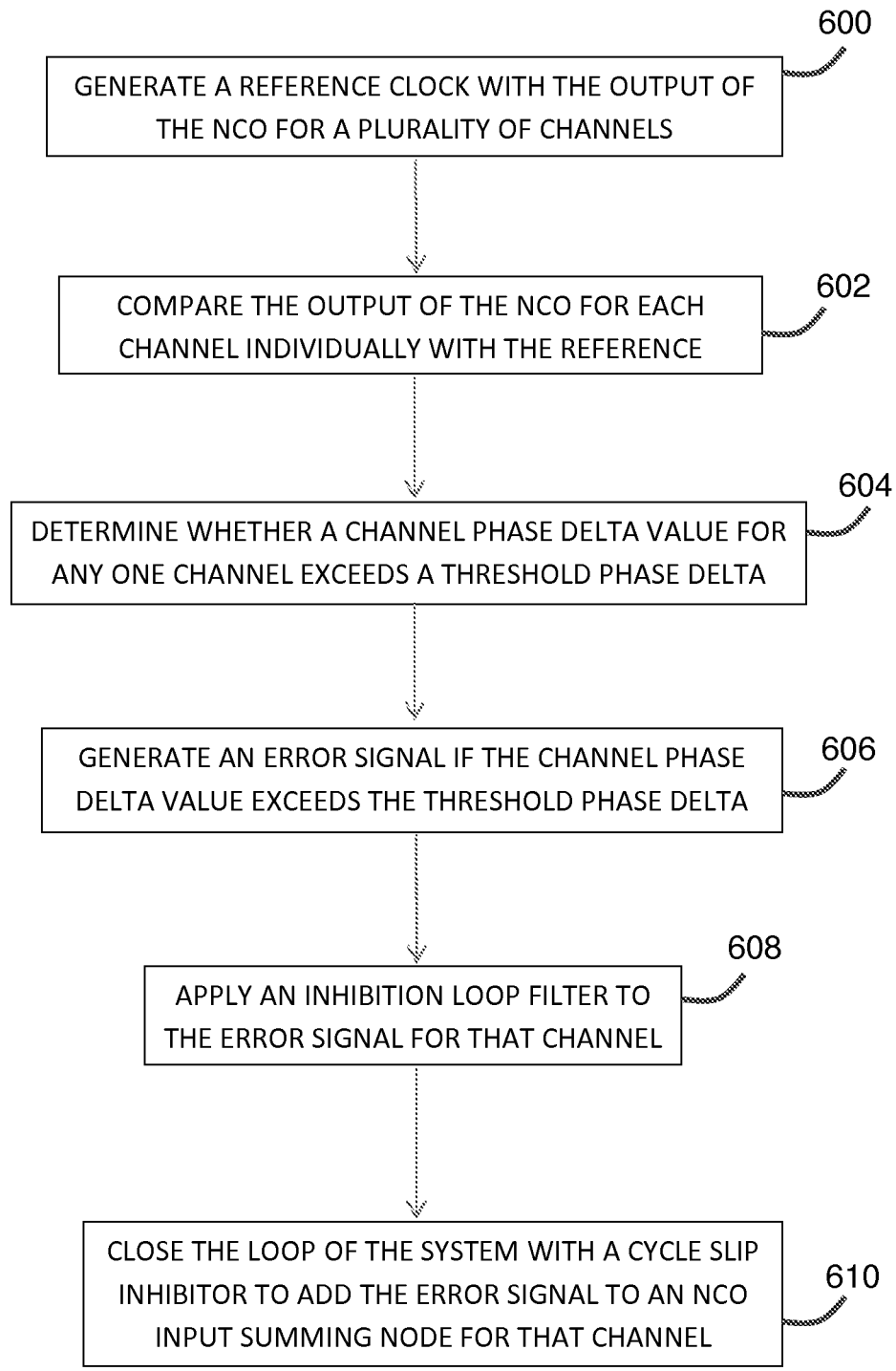
FIG. 6 is a flow chart illustrating one embodiment of a method of detecting and inhibiting cycle slip in a multi-channel system.

FIG. 6 is a flow chart illustrating one embodiment of a method of detecting and inhibiting cycle slip in a multi-channel system. At step 600, the reference clock is generated from the output of the NCO for a plurality of or all of the channels, as described hereinabove.

At step 602, the output of the NCO of each of the channels individually is compared to the reference clock.

At step 604, a determination is made regarding whether the channel phase delta value exceeds the threshold phase delta value for that particular channel.

At step 606, an error signal is generated in the event any one (or more) channel phase delta value exceeds the threshold phase delta value.

At step 608, an inhibition loop filter is applied to the error signal for that (or those) particular channel(s). The inhibition loop filter filters, inhibits, decreases or minimizes noise in the error signal.

At step 610, the cycle slip inhibitor closes the feedback loop of the system and the error signal is added to the NCO input summing node at the NCO for that particular channel to better allow the PLL 24 to adjust the phase of the signal.

In various embodiments, it is recognized that one or more of several programmable controls can be tuned and/or implemented to enhance or improve detection and inhibition of cycle slip, including one or more of the following:

1. The threshold phase delta value setting and hysteresis thresholding can be tuned as described herein.

2. Criteria to establish the steady state phase offset reference for each channel relative to the reference clock. These criteria can range from the simple to the comprehensive, and can include, as one non-exclusive example, using an average value over a reasonable number of samples, excluding samples with relatively large phase variations. Numerous other criteria can likewise be used for this purpose depending upon the design requirements of the system.

3. Cycle slip inhibition loop filter gain and bandwidth. The inhibition loop filter gain can be adjusted based on experimentation for a given system, or it can be adjusted on a similar basis to that of the threshold phase delta value, as described previously. This can be manually or automatically adjusted based on an algorithm, a lookup table, or by any other suitable method. By adjusting the gain, response time, stability and/or performance of the system can be enhanced.

4. Detection and Exclusion of poor performing channels from the group because of low signal to noise ratio or other defects. For example, it may be desirable to exclude the output of the NCO 40 for a particular channel when establishing the reference clock due to a defect in the channel. Some non-exclusive examples of such defects may include a clogged tape head, a defect in the tape, debris, or other features that could cause temporary drop in the signal. The signal level can be monitored by the tape drive to determine if it is currently in a defective section of the tape and therefore exclude that section of the tape.

5. The length of data bits a reference clock can be used before requiring acquisition of a new reference clock. This length of data bits can be dependent upon a typical length of samples before the system accumulates excessive error and invalidates the reference. This length can be determined by the nature of the steadiness and stability of the system. A new reference clock is periodically re-established based on a percentage or fraction of that length so that there are multiple chances to establish a good reference clock before the prior reference clock becomes invalid and no longer accurate. The specific percentage can vary, but can be 75%, 50%, 25%, 10%, 1%, 0.1%, or 0.01% of the length of data bits that normally would cause excess accumulation of error to invalidate the reference, in non-exclusive alternative embodiments. In other embodiments, the specific percentage can be greater than, less than or between the above-listed percentages.

While a number of exemplary aspects and embodiments of the tape drive 10, controller 22 and the cycle slip detection and inhibition system 38 have been discussed above, those of skill in the art will recognize certain modifications, permutations, additions and sub-combinations thereof are also applicable. It is therefore intended that the following appended claims and claims hereafter introduced are interpreted to include all such modifications, permutations, additions and sub-combinations as are within their true spirit and scope.

What is claimed is:

1. A method for inhibiting cycle slip in a tape drive having three channels, each channel utilizing a corresponding numerically controlled oscillator, the method comprising the steps of:

establishing a reference clock that is based on an output of the numerically controlled oscillators for at least two of the channels;

comparing the output of the numerically controlled oscillator for one of the three channels with the reference clock to determine a first channel phase delta value for the one channel; and determining whether the first channel phase delta value exceeds a threshold phase delta value for the one channel.

2. The method of claim 1 further comprising the step of: if the first channel phase delta value exceeds the threshold phase delta value, generating an error signal for the one channel.

3. The method of claim 2 further comprising the step of applying an inhibition loop filter to the error signal for the one channel.

4. The method of claim 2 further comprising the step of feeding back the error signal to the numerically controlled oscillator of the one channel.

5. The method of claim 1 further comprising the step of reestablishing the reference clock on a periodic basis.

6. The method of claim 1 further comprising the step of setting the threshold phase delta value based at least partially upon empirical data from monitoring at least one of (i) a phase correction signal of the channel, and (ii) the reference clock.

7. The method of claim 1 further comprising the steps of:
comparing the output of the numerically controlled oscillator for each of the channels with the reference clock to determine a channel phase delta value for each of the channels; and
individually determining whether each of the channel phase delta values exceeds the threshold phase delta value.

8. The method of claim 7 further comprising the step of, for each channel, if the channel phase delta value exceeds the threshold phase delta value, generating an error signal for such channel.

9. The method of claim 8 further comprising the step of, for each channel in which the channel phase delta value exceeds the threshold phase delta value, applying an inhibition loop filter to the error signal for such channel.

10. The method of claim 1 wherein the step of establishing includes the step of excluding the output of the numerically controlled oscillator for one of the three channels.

11. The method of claim 10 wherein the step of excluding includes the step of basing the exclusion on a signal to noise ratio of the one of the three channels.

12. The method of claim 1 wherein the step of establishing includes the step of applying a statistical analysis on the outputs of the numerically controlled oscillators for the at least two channels.

13. The method of claim 12 wherein the statistical analysis is based on Digital Signal Processing of the outputs of the numerically controlled oscillators for the at least two channels.

14. The method of claim 1 wherein the threshold phase delta value changes periodically over time.

15. A tape drive that utilizes the method of claim 1.

16. A method for inhibiting cycle slip in a tape drive having three channels, each channel utilizing a corresponding numerically controlled oscillator, the method comprising the steps of:
establishing a reference clock that is based on an output of the numerically controlled oscillators for at least two of the channels;
individually comparing the output of the numerically controlled oscillator for each of the three channels with the reference clock to determine a channel phase delta value for each channel;
individually determining whether each of the channel phase delta values exceeds a corresponding threshold phase delta value for each channel;
generating an error signal for each channel in which the channel phase delta value exceeds the corresponding threshold phase delta value; and
feeding back the error signal to the numerically controlled oscillator for each of the channels that has a channel phase delta value that exceeds the threshold phase delta value of such channel.

17. The method of claim 16 further comprising the step of applying an inhibition loop filter to the error signal for any channel that has a channel phase delta value that exceeds the threshold phase delta value.

18. A tape drive that utilizes the method of claim 16.

19. A method for inhibiting cycle slip in a tape drive having three channels, each channel utilizing a corresponding numerically controlled oscillator, the method comprising the steps of:
establishing a reference clock that is based on an output of the numerically controlled oscillators for at least two of the channels by applying a statistical analysis on the outputs of the numerically controlled oscillators for the at least two channels;
individually comparing the output of the numerically controlled oscillator for each of the three channels with the reference clock to determine a channel phase delta value for each channel; and
individually determining whether each of the channel phase delta values exceeds a corresponding threshold phase delta value for each channel;
generating an error signal for each channel in which the channel phase delta value exceeds the corresponding threshold phase delta value;
applying an inhibition loop filter to the error signal for each of the channels that has a channel phase delta value that exceeds the threshold phase delta value of such channel;
feeding back the error signal to the numerically controlled oscillator of any channel that has a channel phase delta value that exceeds the threshold phase delta value; and
reestablishing the reference clock on a periodic basis.

20. A tape drive that utilizes the method of claim 19.

* * * * *